United States Patent
Zhu

(10) Patent No.: US 12,328,197 B2
(45) Date of Patent: Jun. 10, 2025

(54) NETWORK SLICE CHARGING METHOD AND APPARATUS

(71) Applicant: Huawei Technologies Co., Ltd., Shenzhen (CN)

(72) Inventor: Lei Zhu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 84 days.

(21) Appl. No.: 17/705,059

(22) Filed: Mar. 25, 2022

(65) Prior Publication Data

US 2022/0217005 A1 Jul. 7, 2022

Related U.S. Application Data

(63) Continuation of application No. PCT/CN2020/086880, filed on Apr. 24, 2020.

(30) Foreign Application Priority Data

Sep. 29, 2019 (CN) .......................... 201910936221.2

(51) Int. Cl.
*H04L 12/14* (2024.01)
*H04W 28/16* (2009.01)

(52) U.S. Cl.
CPC ...... *H04L 12/1407* (2013.01); *H04L 12/1414* (2013.01); *H04W 28/16* (2013.01)

(58) Field of Classification Search
CPC . H04L 12/1407; H04L 12/1414; H04W 28/16
(Continued)

(56) References Cited

U.S. PATENT DOCUMENTS 10,958,525 B2 3/2021 Fang
11,438,739 B2 9/2022 Han et al.
(Continued)

FOREIGN PATENT DOCUMENTS

CN 109429244 A 3/2019
CN 109600246 A 4/2019
(Continued)

OTHER PUBLICATIONS

"Network Slice Management Charging—Solution," Source: Nokia, Nokia Shanghai Bell, Document for: Approval, Agenda Item: 5.2.1, 3GPP TSG SA WG5 Meeting #125Ad-hoc, S5-194347, Revision of S5-194053, Jun. 25-28, 2019, Sapporo, Japan, 3 pages.
(Continued)

*Primary Examiner* — Obaidul Huq
(74) *Attorney, Agent, or Firm* — Slater Matsil, LLP

(57) ABSTRACT

This application provides a network slice charging method and an apparatus. The method includes: A network slice management network element receives a first request including a charging requirement of a network slice. The network slice management network element sends to a network slice subnet management network element, a second request including the charging requirement. The network slice management network element receives first charging data of the network slice, which is collected based on the charging requirement. The network slice management network element sends the first charging data to a charging network element for the charging network element to charge the network slice.

20 Claims, 6 Drawing Sheets

(58) Field of Classification Search
USPC .......................................................... 370/259
See application file for complete search history.

(56) References Cited

U.S. PATENT DOCUMENTS

| | | | | |
|---|---|---|---|---|
| 2018/0220277 | A1* | 8/2018 | Senarath | H04M 15/8027 |
| 2018/0316564 | A1 | 11/2018 | Senarath | |
| 2020/0092423 | A1* | 3/2020 | Qiao | H04W 80/10 |
| 2020/0112861 | A1* | 4/2020 | Yao | H04L 41/0894 |
| 2020/0145538 | A1* | 5/2020 | Qiao | H04M 15/85 |
| 2020/0359440 | A1* | 11/2020 | Qiao | H04W 76/12 |
| 2020/0413326 | A1* | 12/2020 | Stille | H04L 12/1407 |

FOREIGN PATENT DOCUMENTS

| | | |
|---|---|---|
| CN | 109873730 A | 6/2019 |
| CN | 110213800 A | 9/2019 |
| CN | 110225474 A | 9/2019 |
| WO | 2019182493 A1 | 9/2019 |

OTHER PUBLICATIONS

"3rd Generation Partnership Project; Technical Specification Group Services and System Aspects; Study on security aspects of 5G network slicing management (Release 15)," 3GPP TR 33.811 V1.0.0, Jun. 2018, 19 pages.

"PCR 28.530 Add the set of network slicing management functions," Source: Huawei, Document for: Approval, Agenda Item: 6.4.3, 3GPP TSG SA WG5 (Telecom Management) Meeting #116 S5-176104 revision of S5A-17xabc, Nov. 27-Dec. 1, 2017, Reno, US, 4 pages.

"Addition of a few editorial corrections and many clarifications between NW Slice and NW Slice Instance," Source: Huawei, Vodafone, Document for: Approval, Agenda Item: 7.5.1, 3GPP TSG-SA5 Meeting #124, S5-192295, Revision of S5-192274, Taipei, Taiwan Feb. 25-Mar. 1, 2019, 7 pages.

* cited by examiner

NETWORK SLICE CHARGING METHOD AND APPARATUS

CROSS-REFERENCE TO RELATED APPLICATIONS

This application is a continuation of International Application No. PCT/CN2020/086880, filed on Apr. 24, 2020, which claims priority to Chinese Patent Application No. 201910936221.2, filed on Sep. 29, 2019. The disclosures of the aforementioned applications are hereby incorporated by reference in their entireties.

TECHNICAL FIELD

This application relates to the field of mobile communication technologies, and in particular, to a network slice charging method and an apparatus.

BACKGROUND

A current 5th generation (5G) charging system supports charging based on a protocol data unit (PDU) session, and charging data is generated by a session management network element. The session management network element is responsible for session management, and functions of the session management network element include creation, maintenance, modification, and deletion of the PDU session. Therefore, the session management network element collects usage information of PDU session data connections on a user plane network element, to obtain a data source that generates the charging data.

Currently, a concept of a network slice is introduced into 5G communication. The network slice may be considered as a communication network that is created to meet a service requirement and that includes a plurality of network function network elements.

Currently, there is no corresponding method for charging the network slice.

SUMMARY

This application provides a network slice charging method and an apparatus, to provide a network slice charging method.

According to a first aspect, this application provides a network slice charging method. The method includes: A network slice management network element receives a first request, where the first request includes a charging requirement of a network slice. The network slice management network element sends a second request to a network slice subnet management network element, where the second request includes the charging requirement. The network slice management network element receives first charging data of the network slice, where the first charging data is collected based on the charging requirement. The network slice management network element sends the first charging data to a charging network element, where the first charging data is used by the charging network element to charge the network slice. In the foregoing solution, the network slice can be charged, and the network slice can be accurately charged.

In a possible implementation method, the first charging data is from one or more of the following network elements: the network slice subnet management network element, a network function network element, and a network function management network element.

In a possible implementation method, the network slice management network element collects second charging data based on the charging requirement; and the network slice management network element sends the second charging data to the charging network element, where the second charging data is used by the charging network element to charge the network slice.

In a possible implementation method, the network slice management network element sends a third request to the charging network element, where the third request is used to request to enable a network slice instance charging function.

In a possible implementation method, the third request is a network slice charging session request or an event charging request.

In a possible implementation method, the charging requirement includes at least one of the following: a charged object, a charging mode, and a rule for selecting a charging function.

In a possible implementation method, the first request is a network slice instance creation request, and the second request is a network slice subnet instance creation request. Alternatively, the first request is a network slice instance modification request, and the second request is a network slice subnet instance modification request.

According to a second aspect, this application provides a network slice charging method. The method includes: A network slice subnet management network element receives a second request from a network slice management network element, where the second request includes a charging requirement. The network slice subnet management network element determines, based on the charging requirement, a first charging sub-requirement corresponding to a network function network element. The network slice subnet management network element sends the first charging sub-requirement to the network function network element, where the first charging sub-requirement is used by the network function network element to collect first charging data of a network slice, and the first charging data is used by a charging network element to charge the network slice. In the foregoing solution, the network slice can be charged, and the network slice can be accurately charged.

In a possible implementation method, the network slice subnet management network element receives the first charging data from the network function network element; and the network slice subnet management network element sends the first charging data to the network slice management network element, where the first charging data is sent by the network slice management network element to the charging network element, or the network slice subnet management network element sends the first charging data to the charging network element.

In a possible implementation method, the network slice subnet management network element determines, based on the charging requirement, a second charging sub-requirement corresponding to network slice subnet management network element; and the network slice subnet management network element collects the second charging data of the network slice based on the second charging sub-requirement, where the second charging data is used by the charging network element to charge the network slice.

In a possible implementation method, the network slice subnet management network element sends the second charging data to the network slice management network element, where the second charging data is sent by the network slice management network element to the charging network element; or the network slice subnet management network element sends the second charging data to the charging network element.

In a possible implementation method, the second request is a network slice subnet instance creation request or a network slice subnet instance modification request.

According to a third aspect, this application provides a network slice charging method. The method includes: A network function network element receives a charging requirement of a network slice. The network function network element collects charging data of the network slice based on the charging requirement. The network function network element sends the charging data, where the charging data is used by a charging network element to charge the network slice. In the foregoing solution, the network slice can be charged, and the network slice can be accurately charged.

In a possible implementation method, that the network function network element sends the charging data includes: The network function network element sends the charging data to a network slice subnet management network element, where the charging data is sent by the network slice subnet management network element to the charging network element; the network function network element sends the charging data to a network slice management network element, where the charging data is sent by the network slice management network element to the charging network element; or the network function network element sends the charging data to the charging network element.

According to a fourth aspect, this application provides a communication apparatus. The apparatus may be a network slice management network element, or may be a chip used for the network slice management network element. The apparatus has a function of implementing the first aspect or the embodiments of first aspect. The function may be implemented by hardware, or may be implemented by hardware executing corresponding software. The hardware or the software includes one or more modules corresponding to the function.

According to a fifth aspect, this application provides a communication apparatus. The apparatus may be a network slice subnet management network element, or may be a chip used for the network slice subnet management network element. The apparatus has a function of implementing the second aspect or the embodiments of the second aspect. The function may be implemented by hardware, or may be implemented by hardware executing corresponding software. The hardware or the software includes one or more modules corresponding to the function.

According to a sixth aspect, this application provides a communication apparatus. The apparatus may be a network function network element, or may be a chip used for the network function network element. The apparatus has a function of implementing the third aspect or the embodiments of the third aspect. The function may be implemented by hardware, or may be implemented by hardware executing corresponding software. The hardware or the software includes one or more modules corresponding to the function.

According to a seventh aspect, this application provides a communication apparatus, including a processor and a memory. The memory is configured to store computer-executable instructions, and when the apparatus runs, the processor executes the computer-executable instructions stored in the memory, to enable the apparatus to perform the method in the foregoing aspects or the embodiments of the aspects.

According to an eighth aspect, this application provides a communication apparatus, including units or means configured to perform the foregoing aspects or the steps of the aspects.

According to a ninth aspect, this application provides a communication apparatus, including a processor and an interface circuit. The processor is configured to: communicate with another apparatus by using the interface circuit, and perform the methods according to the foregoing aspects or the embodiments of the aspects. There are one or more processors.

According to a tenth aspect, this application provides a communication apparatus, including a processor, configured to be connected to a memory, and configured to invoke a program stored in the memory, to implement the method according to the foregoing aspects or the embodiments of the aspects. The memory may be located inside the apparatus, or may be located outside the apparatus. In addition, there are one or more processors.

According to an eleventh aspect, this application further provides a computer-readable storage medium. The computer-readable storage medium stores instructions, and when the instructions are run on a computer, the processor is enabled to perform the methods according to the foregoing aspects or the embodiments of the aspects.

According to a twelfth aspect, this application further provides a computer program product including instructions. When the computer program product runs on a computer, the computer is enabled to perform the method according to the foregoing aspects or the embodiments of the aspects.

According to a thirteenth aspect, this application further provides a chip system, including a processor, configured to implement the method according to foregoing aspects or the embodiments of the aspects.

According to a fourteenth aspect, this application further provides a communication system, including a network slice management network element configured to implement the method in the first aspect or any implementation of the first aspect and a network slice subnet management network element configured to implement the method in the second aspect or any implementation of the second aspect.

In a possible implementation method, the system further includes a network function network element configured to implement the third aspect or any implementation method of the third aspect.

DETAILED DESCRIPTION OF ILLUSTRATIVE EMBODIMENTS

To make objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise specified, "a plurality of" means two or more than two.

Figure 1A:
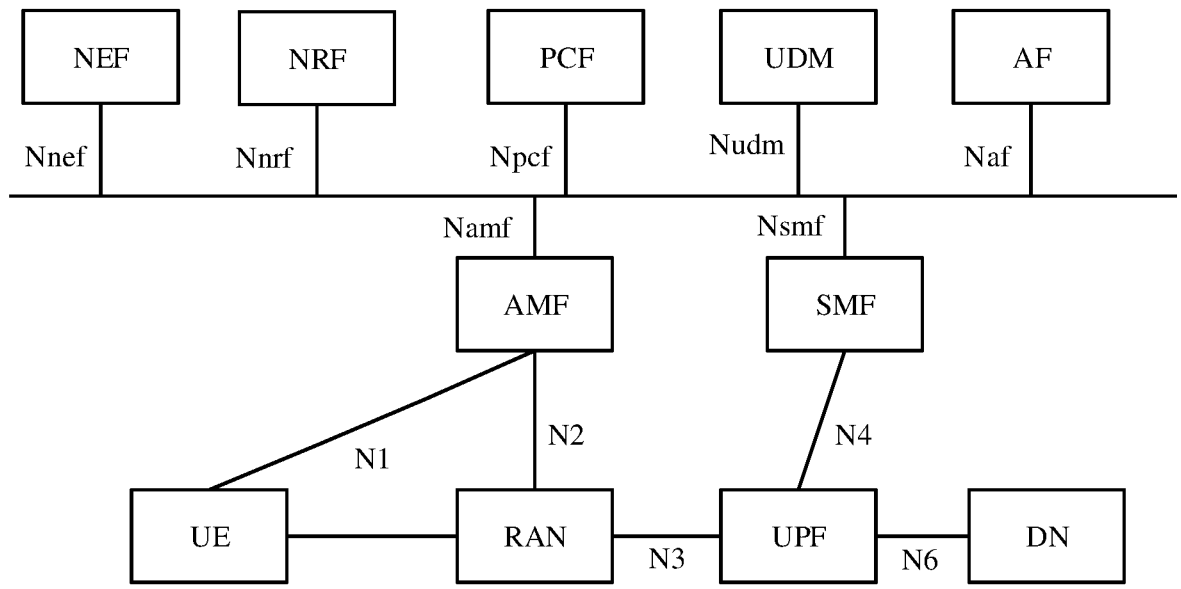
FIG. 1A is a schematic diagram of a 5G network architecture based on a service-based architecture.

FIG. 1A is a schematic diagram of a 5G network architecture based on a service-based architecture. The 5G network architecture shown in FIG. 1A may include three parts: a terminal device, a data network (DN), and a carrier network. The following briefly describes functions of some network elements.

The carrier network may include one or more of the following network elements: a network exposure function (NEF) network element, a network repository function (NRF) network element, a policy control function (PCF) network element, a unified data management (UDM) network element, an application function (AF) network element, an access and mobility management function (AMF) network element, a session management function (SMF) network element, a radio access network (RAN), a user plane function (UPF) network element, and the like. In the foregoing carrier network, a part other than the radio access network may be referred to as a core network.

A terminal device which may also be referred to as user equipment (UE) is a device having a wireless transceiver function, and may be deployed on land, indoor or outdoor, or may be a handheld device or a vehicle-mounted device; may be deployed on water; or may be deployed in the air (for example, on a plane, a balloon, or a satellite). The terminal device may be a mobile phone, a pad, a computer having a wireless transceiver function, a virtual reality (VR) terminal, an augmented reality (AR) terminal, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like.

The terminal device may establish a connection to the carrier network by using an interface (for example, N1) provided by the operate network, and use services such as a data service and/or a voice service provided by the carrier network. The terminal device may further access the DN by using the carrier network, and use an operator service deployed on the DN and/or a service provided by a third party. The third party may be a service provider other than the carrier network and the terminal device, and may provide services such as a data service and/or a voice service to the terminal device. A specific representation form of the third party may be specifically determined based on an actual application scenario, and is not limited herein.

The RAN is a sub-network of the carrier network, and is an implementation system between a service node in the carrier network and the terminal device. To access the carrier network, the terminal device first passes through the RAN, and may be connected to the service node of the carrier network through the RAN. A RAN device in this application is a device that provides a wireless communication function to a terminal device, and the RAN device is also referred to as an access network device. The RAN device in this application includes but is not limited to: a next generation NodeB (gNodeB, gNB) in 5G, an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a transmission reception point (TRP), a transmission point (TP), a mobile switching center, and the like.

The AMF network element is a control plane network element provided by the carrier network, and is responsible for access control and mobility management when the terminal device accesses the carrier network, for example, including functions such as mobility state management, allocation of a temporary user identity, and user authentication and authorization.

The SMF network element is mainly responsible for session management in a mobile network, such as session establishment, modification, and release. For example, a specific function is allocating an IP address to a user, and selecting a UPF that provides a packet forwarding function.

The UPF network element is responsible for forwarding and receiving user data in the terminal device. The UPF network element may receive the user data from a data network, and transmit the user data to the terminal device by using the access network device. Alternatively, the UPF network element may receive the user data from the terminal device by using the access network device, and forward the user data to a data network. A transmission resource and a scheduling function on the UPF network element that serve the terminal device are managed and controlled by the SMF network element.

The UDM network element is configured to generate an authentication credential, process a user identifier (for example, store and manage a permanent identity of a user), perform access authorization control, manage subscription data, and the like.

The NEF network element is mainly configured to support a capability and event exposure.

The AF network element mainly supports interaction with a 3rd generation partnership project (3GPP) core network to provide services, for example, influence data routing, control a policy, or provide some third-party services for a network side.

The PCF network element mainly supports providing a unified policy framework to control network behavior, and providing a policy rule for a control layer network function, and is responsible for obtaining policy decision-related subscription information of a user.

The NRF network element may be used to provide a network element discovery function and provide network element information corresponding to a network element type based on a request of another network element. The NRF further provides a network element management service, for example, registration, update, and deregistration of a network element and subscription and push of a network element status.

A DN is a network located outside the carrier network. The carrier network may access a plurality of DNs. A plurality of services may be deployed on the DN, and the DN may provide services such as a data service and/or a voice service for the terminal device. For example, the DN is a private network of a smart factory, a sensor installed in a workshop of the smart factory may be a terminal device, a control server of the sensor is deployed in the DN, and the control server may provide a service to the sensor. The sensor may communicate with the control server, to obtain instructions of the control server, transmit collected sensor data to the control server according to the instructions, and the like. For another example, the DN is an internal office network of a company, a mobile phone or a computer of an employee may be a terminal device, and the mobile phone or the computer of the employee may access information, data resources, and the like on the internal office network of the company.

In FIG. 1A, Nnef, Nnrf, Npcf, Nudm, Naf, Namf, Nsmf, N1, N2, N3, N4, and N6 are interface sequence numbers. For meanings of these interface sequence numbers, refer to meanings defined in the 3GPP standard protocol. This is not limited herein.

Figure 1B:
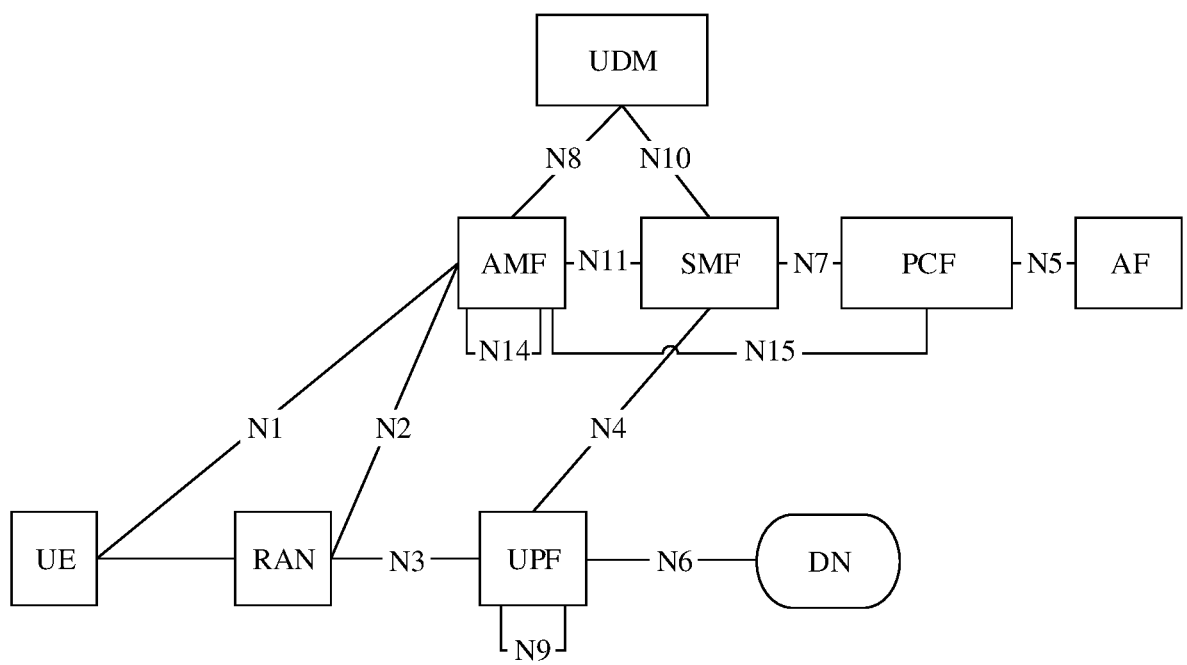
FIG. 1B is a schematic diagram of a 5G network architecture based on a point-to-point interface.

FIG. 1B is a schematic diagram of a 5G network architecture based on a point-to-point interface. For descriptions of functions of network elements in FIG. 1B, refer to descriptions of functions of corresponding network elements in FIG. 1A. Details are not described again. A main difference between FIG. 1B and FIG. 1A lies in that interfaces between network elements in FIG. 1B are point-to-point interfaces rather than service-oriented interfaces. It should be noted that FIG. 1B further includes other network elements such as an NEF and an NRF, which is not shown in FIG. 1B.

In the architecture shown in FIG. 1B, an interface between the UE and the AMF network element is referred to as an N1 interface, an interface between the AMF network element and the RAN device is referred to as an N2 interface, an interface between the RAN device and the UPF network element may be referred to as an N3 interface, an interface between the SMF network element and the UPF network element is referred to as an N4 interface, an interface between the PCF network element and the AF network element is referred to as an N5 interface, an interface between the UPF network element and the DN is referred to as an N6 interface, an interface between the SMF network element and the PCF network element is referred to as an N7 interface, an interface between the AMF network element and the UDM network element is referred to as an N8 interface, an interface between different UPF network elements is referred to as an N9 interface, an interface between the UDM network element and the SMF network element is referred to as an N10 interface, an interface between the AMF network element and the SMF network element is referred to as an N11 interface, an interface between different AMF network elements is referred to as an N14 interface, and an interface between the AMF network element and the PCF network element is referred to as an N15 interface.

It may be understood that the network elements or the functions may be network elements in a hardware device, software functions running on dedicated hardware, or virtualized functions instantiated on a platform (for example, a cloud platform). Optionally, the foregoing network elements or functions may be implemented by one device, or may be jointly implemented by a plurality of devices, or may be one function module in one device. This is not specifically limited in the embodiments of this application.

Further, in the architecture shown in FIG. 1A or FIG. 1B, a network slice management network element, a network slice subnet management network element, a network function management network element, and a charging network element may be further added. The network slice management network element may be, for example, a network slice management function (NSMF) network element referred to as NSMF for short. The network slice subnet management network element may be, for example, a network slice subnet management function (NSSMF) network element, referred to as NSSMF for short. The network function management network element may be, for example, a network function management function (NFMF) network element, referred to as NFMF for short. The charging network element may be, for example, a charging function (CHF) network element, referred to as CHF for short.

The mobility management network element, the session management network element, the policy control network element, the application function network element, the access network device, the network exposure function network element, and the user plane network element in this application may be respectively the AMF, the SMF, the PCF, the AF, the RAN, the NEF and the UPF in FIG. 1A or FIG. 1B, or may be network elements that have functions of the AMF, the SMF, the PCF, the AF, the RAN, the NEF, and the UPF in future communication such as a 6th generation (6G) network. This is not limited in this application. For ease of description, this application is described by using an example in which the mobility management network element, the session management network element, the policy control network element, the application function network element, the access network device, the network exposure function network element, and the user plane network element are respectively the AMF, the SMF, the PCF, the AF, the RAN, the NEF, and the UPF. In addition, the terminal device is referred to as UE for short in this application.

It should be noted that some network elements of the core network may be collectively referred to as network function (NF) network elements referred to as NF for short. For example, the NF includes the AMF, the UPF, the SMF, the PCF, and the like.

For ease of understanding the present invention, the following describes some terms in the embodiments of the present invention, and details are not described subsequently.

1. 5G Charging System Technologies

In a 5G core network architecture, a charging system includes a charging trigger function (CTF) network element and a CHF. Based on the charging network architecture, the CTF generates charging data and sends the charging data to the CHF. The CHF includes a function of generating a charging data record (CDR). The charging system further includes a charging gateway function (CGF) network element, and the CHF forwards the CDR to the CGF.

A current 5G charging system supports charging based on a protocol data unit (PDU) session, and charging data is generated by an SMF integrated with a CTF. The SMF is responsible for session management, and functions of the SMF include creation, maintenance, modification, and deletion of the PDU session. Therefore, the SMF collects usage information of PDU session data connections on a UPF, to obtain a data source that generates the charging data.

In a process in which the SMF sends the generated charging data to the CHF, quota management is further supported between the SMF and the CHF. A quota is a limit of slice charging usage in the charging system. Generally, a part of the quota is first allocated to a network, and after the quota is used up, a new quota is applied to the charging system. In addition, the SMF maintains the charging data in a charging session. Therefore, the SMF needs to establish a charging session between the SMF and the CHF in a PDU session establishment phase.

On a 5G network, the SMF can include single network slice selection assistance information (S-NSSAI) in the charging data sent to the CHF. Therefore, network slice-based charging is supported. In this case, the charging data received by the CHF includes S-NSSAI of a network slice instance in which the PDU session is located. Therefore, the S-NSSAI may be included in the generated CDR, so that statistics about usage of a data connection in a network slice can be collected.

2. Network Slice

According to a definition in the industry, the network slice may be considered as a communication network that is created to meet a service requirement and that includes a plurality of network function network elements. The network slice may be shared by a plurality of services, or may be exclusively used by one service, and is applicable to a plurality of communication services deployed on a same infrastructure of an operator.

The network slice is an on-demand networking mode, and network carriers deploy a plurality of virtual network slices or end-to-end networks on a unified infrastructure. Each network slice is logically isolated from a radio access network, a bearer network, and a core network to adapt to various types of service applications. A network slice includes at least a radio sub-slice, a bearer sub-slice, and a core network sub-slice.

A network slice deployment template defines a structure, a configuration, and the like of a network slice. A network slice instance deployed based on the network slice deployment template is a complete logical network formed by a series of orchestrated, deployed, and configured network functions and resources included in the network functions, and may meet a specific network requirement.

Network functions virtualization (NFV) is a prerequisite for the network slice. A core network is used as an example. The NFV divides software and hardware from a conventional network element device. The hardware is deployed on a universal server, and the software is assumed by different NFs (network functions). In this way, services can be flexibly assembled.

During creation of the network slice, a virtual resource and a physical resource that are required by a particular communication service type may be selected based on a service level agreement (SLA), and a network function required for supporting the SLA is deployed. The SLA includes parameters such as a quantity of users, quality of service (QoS), and bandwidth. Different SLAs define different communication service types.

Creation of the network slice instance (observed from a management layer) is an instantiation process triggered based on a service requirement of a communication service consumer. The communication service consumer has a plurality of types of service requirements for a network slice, which may be roughly classified into: latency, guaranteed/non-guaranteed QoS, peak throughput, data volume, reliability, upstream/downstream throughput for single network slice instance, mean number of PDU sessions of network slice instance, registered subscribers of network slice instance, mobility, and coverage area.

Some of the foregoing SLA requirements are achieved through a network slice instance modification process, for example, a network slice capacity issue, and some are achieved through a network service configuration process, for example, a coverage area of a service, UE density support of a service, and a maximum peak rate.

For charging of the network slice, the charging system expects to collect information related to the SLA of the network slice, and use the collected information as a basis for the charging system to generate charging data, a CDR and a bill. Different types of communication services have different SLA requirements for network slices. Therefore, charging requirements for network slices are different, and related charging requirements and differences need to be clarified in a charging process.

3. Relationship Between a Network Slice Management Operation and Network Slice Charging In the network slice charging, there is a dependency relationship on network slice life cycle management, for example, creation, modification, or deletion of a network slice instance, and activation or deactivation of a slice. Generally, the network slice instance is deactivated before the network slice is modified. After the network slice is modified, a service configuration of a network function needs to be modified, and after the service configuration is modified, an activation operation is started.

It should be noted that a life cycle management operation of a network slice is usually in a deployment phase. A network slice creation/modification/deletion operation responsible by a network slice management entity may be an instantiation operation (for example, creating a virtual resource, creating a virtual machine, loading a software image, or loading an initial configuration) of a network slice instance.

In a running phase of the network slice instance, the network slice instance runs as a network instance, and a management entity for reporting operation and maintenance data of the network slice instance is an operation, administration and maintenance (Operation, Administration and Management, OAM) entity. The network slice management entity is used as a part of an operation and maintenance system, and may be used as one of entities that obtain operation and maintenance data.

In another case, after a network slice instance instantiation process is completed, for example, after a shared slice is deployed, a new service (for example, a network slice instance service is identified by using S-NSSAI) is added to the shared network slice instance. In this process, a proper scale-out operation may need to be performed on the network slice instance, and a network function further needs to perform service configuration, for example, configure a corresponding S-NSSAI operation.

Therefore, it may be considered that a network slice instance operation may be an operation in a network slice instantiation process, or may be a network slice modification operation, a network service parameter modification operation, or a network slice activation and deactivation operation performed to add a service after a network slice instance is created.

4. Some Management Functions in this Application

In current standards, the 5G network and network slice management and orchestration standards are defined, a 5G management service-oriented architecture is used, and a management service is defined. Management services for a 5G network include a provisioning management service, a performance management service (PM), and a fault management service (FM).

Management capabilities provided by the management service may be classified into an NF management capability (for example, 5G core network NF management), a network slice subnet management capability, and a network slice management capability. From the management function aspect, an NF management service (or a management capability provided by the NF management service) is provided by an NFMF. A network slice subnet management service (or a network slice subnet management capability) is provided by an NSSMF, and a network slice management service (or a network slice management capability) is provided by the NFMF. In addition, a communication service management function (CSMF) is also included. The following describes the CSMF, the NSMF, the NSSMF, and the NFMF.

1. CSMF: used to subscribe to and process a communication service requirement of a user service, convert the communication service requirement into a network slice requirement for the NSMF, and send a network slice deployment request to the NSMF based on the network slice requirement. Objects managed by the CSMF are communication services, and each communication service is implemented by one or more network slice functions.
2. NSMF: used to receive a network slice deployment request delivered by the CSMF and deliver a network subnet slice deployment request to the NSSMF. Objects managed by the NSMF are network slices, and each network slice may include one or more network subnet slices (also referred to as a sub-network slice, a network sub-slice, a sub-slice, a network slice subnet, or the like).
3. NSSMF: used to receive the network subnet slice deployment request delivered by the NSMF and deliver a network function deployment request to the NFMF. Objects managed by the NSSMF are network subnet slices, and each network subnet slice may be a basic sub-slice, or may be a sub-slice formed by combining a plurality of basic sub-slices. Each sub-slice may include one or more network functions.
4. NFMF: used to manage NFs, such as an AMF, an SMF, a UPF, and a PCF.

5. Cooperation Between Network Slice Management and Network Management

Network slice management functions include network slice life cycle management, network slice PM, network slice FM, and the like. Network management includes network configuration, the PM, and the FM. Since data sources of the PM/FM of the network slice management and the PM/FM of the network management are the same, management objectives to be achieved are similar. Therefore, it may be considered that there is no obvious difference between the PM/FM of the network slice management and the PM/FM of the network management.

Because the NFMF has a capability of managing a network slice life cycle, the network slice management function and the network slice subnet management function mainly function in a network slice deployment phase. After a network slice instance is created, the scope of network management (a capability such as OAM) in a running state is mainly the scope of network management.

It should be noted that when the network slice instance is shared by a plurality of tenants, management data of one tenant in the network slice instance needs to be separately counted. Therefore, in a charging process of the network slice, for management data of one tenant, charging data needs to be separately generated based on a tenant identifier (tenant ID) and the charging data of the corresponding tenant, and an independent charging session needs to be established. Further, the network slice subnet management function and the network function management function are deployed at a same location, and are respectively responsible for slice subnet management and NF management. For a relationship between the network slice subnet management function and the network function management function, refer to a cooperation relationship between the network slice management and the network management system. An identifier used to distinguish between different services at an NF level is S-NSSAI, and related management data of different network slice instances is distinguished by using the S-NSSAI.

Figure 2:
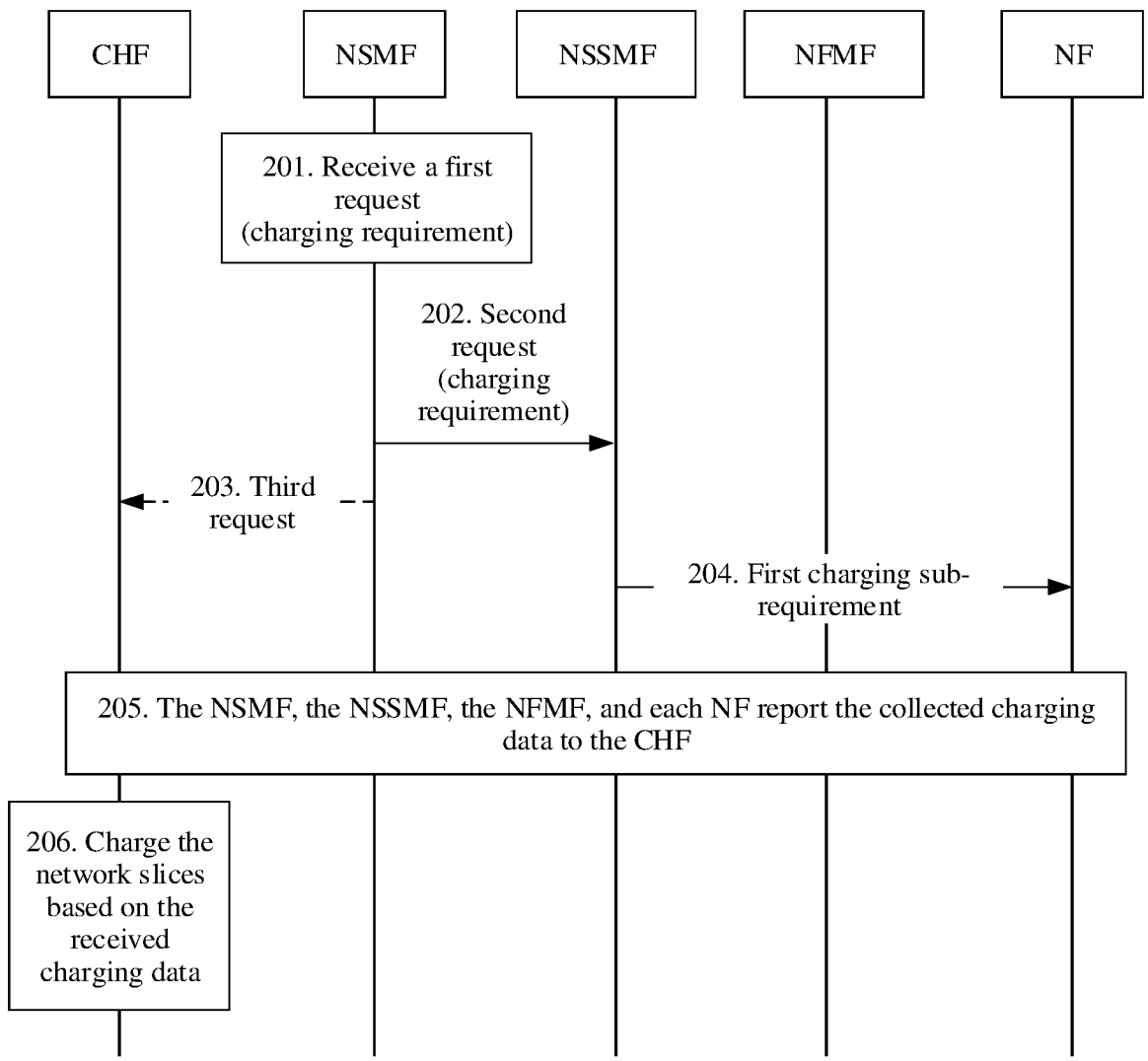
FIG. 2 is a schematic diagram of a network slice charging method according to an embodiment of this application.

To resolve the problem mentioned in the background, based on the network architecture shown in FIG. 1A or FIG. 1B, this application provides a network slice charging method. As shown in FIG. 2, the method includes the following steps:

Step 201: An NSMF receives a first request, where the first request includes a charging requirement of a network slice.

For example, the NSMF receives the first request from a CSMF or another network element.

The charging requirement herein includes at least one of the following: a charged object, a charging mode, and a rule for selecting a charging function (CHF). The charged object includes at least one of the following: a quantity of user connections, a quantity of users, a throughput, a quantity of sessions, session duration, and virtual resources. The charging mode includes offline or online. The rule for selecting a charging function is used to search for an address of a charging function network element.

Step 202: The NSMF sends a second request to an NSSMF, where the second request includes the charging requirement. Correspondingly, the NSSMF may receive the second request.

In an implementation, the first request is a network slice instance creation request, and the second request is a network slice subnet instance creation request. In another implementation, the first request is a network slice instance modification request, and the second request is a network slice subnet instance modification request.

Step 203: The NSMF sends a third request to the CHF. Correspondingly, the CHF may receive the third request.

The third request is used to request to enable a network slice instance charging function. The third request may be, for example, a network slice charging session request or an event charging request.

This step is optional.

Step 204: The NSSMF determines, based on the charging requirement, a first charging sub-requirement corresponding to an NF, and sends the first charging sub-requirement to the NF, where the first charging sub-requirement is used by the NF to collect first charging data of the network slice, and the first charging data is used by the CHF to charge the network slice. Correspondingly, the NF may receive the first charging sub-requirement.

For example, the first charging sub-requirement sent to an AMF carries a charged object (for example, a quantity of user connections, a quantity of users, or a throughput), a charging mode (for example, offline or online), and a rule for selecting a charging function. For another example, the first charging sub-requirement sent to an SMF carries a charged object (for example, a quantity of sessions or session duration), a charging mode (for example, offline or online), and a rule for selecting a charging function.

Step 205: The NSMF, the NSSMF, an NFMF, and each NF report the collected charging data to the CHF.

That is, each NF collects charging data for a corresponding charged object in a corresponding charging mode based on a first charging sub-requirement sent to the NF, and then reports the charging data to the CHF.

The NSSMF obtains a second charging sub-requirement based on the charging requirement sent by the NSMF, collects charging data for a corresponding charged object in a corresponding charging mode, and then reports the charging data to the CHF.

The NFMF collects charging data for a corresponding charged object in a corresponding charging mode based on a charging sub-requirement (which may be referred to as a third charging sub-requirement) sent by the NSSMF, and then reports the charging data to the CHF.

The NSMF collects charging data for a corresponding charged object in a corresponding charging mode based on the charging requirement, and then reports the charging data to the CHF.

As an example, the following describes the charging data collected and reported by the NSMF, the NSSMF, the NFMF, and each NF.

1. Charging Data Collected and Reported by the NF (with an SMF, an AMF, an NEF, and an NWDAF Used as Examples)

1. The SMF may provide charging data related to a PDU session in a network slice instance, such as session duration and a quantity of sessions. The related charging data is collected based on the PDU session.

2. The AMF may provide charging data for AMF-related handover of UE in a network slice instance. When mobility of the UE (that is, the AMF handover) is used as the charging data, a quantity of AMF handover times of the UE counted by the AMF may be provided to the CHF based on a trigger condition of event-based charging. In addition, the AMF may further provide the charging data such as a quantity of user connections, a quantity of users, and a throughput.

3. The NEF may provide a quantity of times that an application (application service) in a network slice instance invokes a network capability application programming interface (API). Based on the trigger condition of event-based charging, the quantity of times that the application invokes the network capability API may be provided to the CHF and used as the charging data.

4. The NWDAF may provide real-time performance statistics data of network performance in a network slice instance, and may further provide advanced performance statistics based on a data analysis capability, for example, statistics about service experience of a service. The NWDAF provides the performance statistics data to the CHF in an event-based charging mode based on performance statistics content and statistics frequency specified in the charging requirement.

2. Charging Data Collected and Reported by the NFMF

The NFMF provides NF-related performance measurements, and typical performance measurements related to a network slice include:

(1) UPF-related performance measurements, including a quantity of packets on an N3 interface, a throughput on the N3 interface, a quantity of packets on an N6 interface, and a throughput on the N6 interface;
  (2) performance measurements provided by the AMF, including: a quantity of registered users on a network slice instance, a quantity of successfully registered users on a network slice instance, a quantity of successful service requests on a network slice instance, a quantity of users registered with a non-3GPP network on a network slice instance, and a quantity of cross-AMF handovers on a network slice instance;
  (3) performance measurements provided by the SMF, including: a quantity of PDU sessions on a network slice instance, a quantity of modified PDU sessions on a network slice instance, and a quantity of released PDU sessions on a network slice instance; and
  (4) usage of virtual resources that can be provided by each network function (NF).

3. Charging Data Collected and Reported by the NSMF

In an implementation method, the NSMF may provide charging data of a network slice management operation to the CHF based on a network slice charging requirement.

4. Charging Data Collected and Reported by the NSSMF

In an implementation method, the NSSMF may provide charging data of a network slice management operation to the CHF based on a network slice charging requirement.

The following describes a method for reporting the charging data collected by the NSMF, the NSSMF, the NFMF, and each NF to the CHF.

1. The method for reporting the charging data collected by each NF to the CHF includes but is not limited to the following implementation methods:

In an implementation method, a path for reporting the charging data by the NF such as the AMF and the SMF to the CHF may be: NF→NWDAF→NFMF→NSSMF→NSMF→CHF. That is, the NF reports the charging data to the CHF through the NWDAF, the NFMF, the NSSMF, and the NSMF.

In another implementation method, a path for reporting the charging data by the NF such as the AMF and the SMF to the CHF may be: NF→NFMF→NSSMF→NSMF→CHF. That is, the NF reports the charging data to the CHF through the NFMF, the NSSMF, and the NSMF.

In another implementation method, a path for reporting the charging data by the NF such as the AMF and the SMF to the CHF may be: NF→NFMF→NSSMF→CHF. That is, the NF reports the charging data to the CHF through the NFMF and the NSSMF.

In another implementation method, a path for reporting the charging data by the NF such as the AMF and the SMF to the CHF may be: NF→NFMF→CHF. That is, the NF reports the charging data to the CHF through the NFMF.

In another implementation method, a path for reporting the charging data by the NF such as the AMF and the SMF to the CHF may be: NF→NWDAF→CHF. That is, the NF reports the charging data to the CHF through the NWDAF.

In another implementation method, a path for reporting the charging data by the NF such as the AMF and the SMF to the CHF may be: NF→CHF. That is, the NF directly reports the charging data to the CHF.

2. The method for reporting the charging data collected by the NFMF to the CHF includes but is not limited to the following implementation methods:

In an implementation method, a path for reporting the charging data by the NFMF to the CHF may be: NFMF→NSSMF→NSMF→CHF. That is, the NFMF reports the charging data to the CHF through the NSSMF and the NSMF.

In another implementation method, a path for reporting the charging data by the NFMF to the CHF may be: NFMF→NSMF→CHF. That is, the NFMF reports the charging data to the CHF through the NSMF.

In another implementation method, a path for reporting the charging data by the NFMF to the CHF may be: NFMF→NSSMF→CHF. That is, the NFMF reports the charging data to the CHF through the NSSMF.

In another implementation method, a path for reporting the charging data by the NFMF to the CHF may be: NFMF→CHF. That is, the NFMF directly reports the charging data to the CHF.

3. The method for reporting the charging data collected by the NSMF to the CHF includes but is not limited to the following implementation method:

In an implementation method, a path for reporting the charging data by the NSMF to the CHF may be: NSMF→CHF. That is, the NSMF directly reports the charging data to the CHF.

4. The method for reporting the charging data collected by the NSSMF to the CHF includes but is not limited to the following implementation methods:

In an implementation method, a path for reporting the charging data by the NSSMF to the CHF may be: NSSMF→CHF. That is, the NSSMF directly reports the charging data to the CHF.

In another implementation method, a path for reporting the charging data by the NSSMF to the CHF may be: NSSMF→NSMF→CHF. That is, the NSSMF reports the charging data to the CHF through the NSMF.

It should be noted that when the NSSMF or the NSMF provides the foregoing charging data to the CHF, the NSSMF or the NSMF may further sort out the charging data based on a network slice charging requirement, and then provide the charging data to the CHF based on a corresponding sending frequency requirement.

Step 206: The CHF charges the network slices based on the received charging data.

In the foregoing solution, the network slice can be charged. In addition, different implementation methods for reporting charging data by network elements are further provided. This helps improve accuracy of charging the network slice.

The following specifically describes the method shown in FIG. 2 with reference to a specific example.

Figure 3:
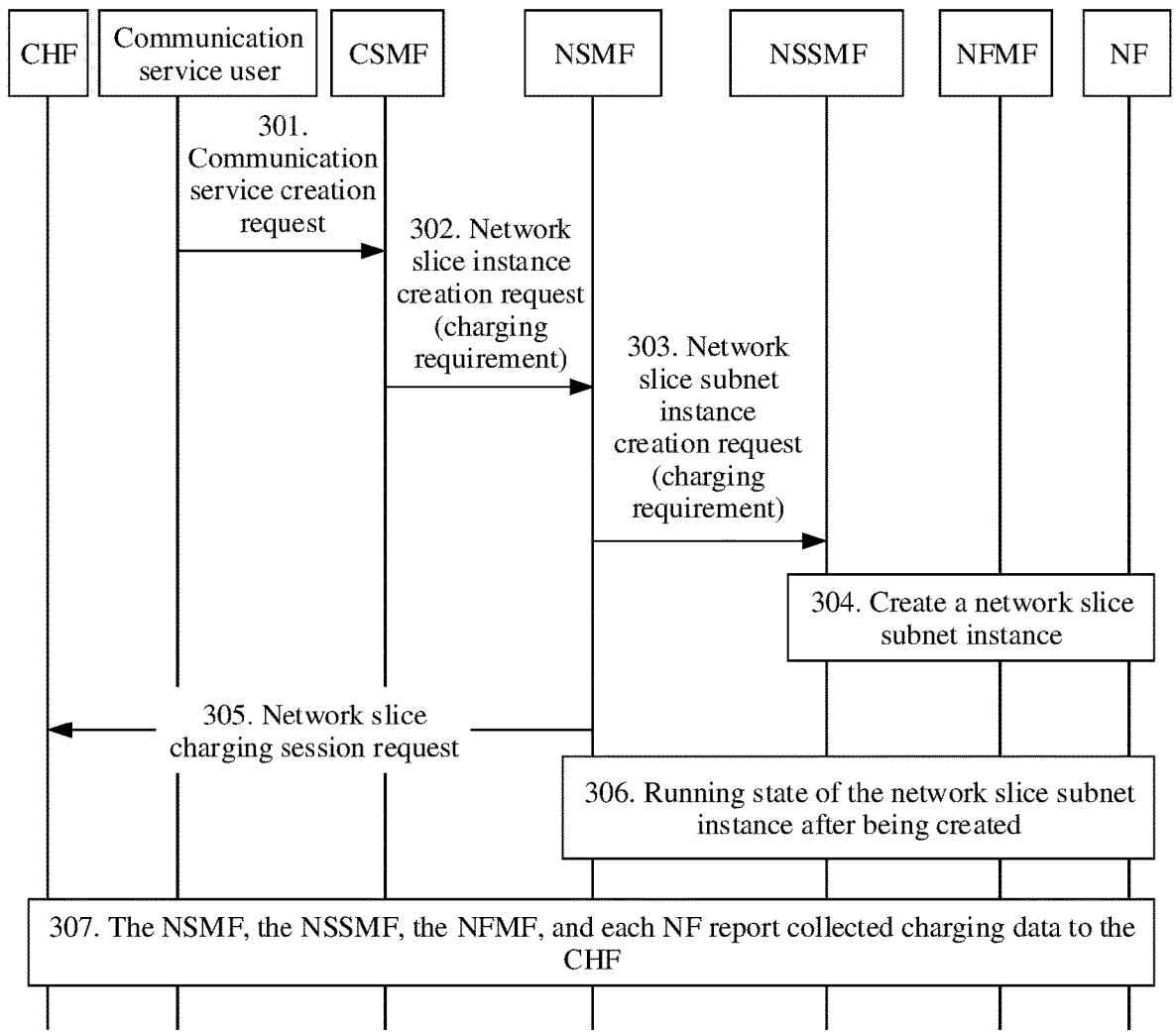
FIG. 3 is a schematic diagram of another network slice charging method according to an embodiment of this application.

FIG. 3 is a schematic flowchart of another network slice charging method according to this application. In the method, a network slice is charged in a network slice deployment process.

The method includes the following steps:

Step 301: A communication service user sends a communication service creation request to a CSMF. Correspondingly, the CSMF may receive the communication service creation request.

Step 302: The CSMF sends a network slice instance creation request to an NSMF. Correspondingly, the NSMF may receive the network slice instance creation request.

The network slice instance creation request carries a charging requirement required by a network slice instance. For content included in the charging requirement, refer to the descriptions in the embodiment of FIG. 2. Details are not described herein again.

Optionally, the network slice instance creation request may further carry a service requirement for network slice creation.

Step 303: The NSMF sends a network slice subnet instance creation request to an NSSMF. Correspondingly, the NSSMF may receive the network slice subnet instance creation request.

The network slice subnet instance creation request carries the charging requirement.

Step 304: The NSSMF creates a network slice subnet instance.

In this process, the NSSMF instantiates the network slice, and configures a corresponding network configuration parameter. Besides, the NSSMF divides the charging requirement into a plurality of charging sub-requirements, and sends the plurality of charging sub-requirements to NFs.

Step 305: The NSMF sends a network slice charging session request to a CHF. Correspondingly, the CHF may receive the network slice charging session request.

If the network slice instance corresponds to an exclusive service or starts a service, the NSMF may send the network slice charging session request (the request is an initial request) to the CHF. After the CHF receives the network slice charging session request, the CHF enables network slice instance charging CHF CDR.

In an alternative implementation solution of step 305, if the network slice charging that the NSMF requests the CHF to create is event-based charging, the NSMF may alternatively send an event charging request (the request is an initial request) to the CHF. After the CHF receives the event charging request, the CHF enables network slice instance charging CHF CDR.

In an implementation method, in this step, the NSMF may obtain an address of the CHF based on a rule of selecting a charging function in the charging requirement.

Step 306: A running state of the network slice subnet instance after being created.

After being created, the network slice subnet instance is in the running state.

Step 307: The NSMF, the NSSMF, the NFMF, and each NF report the collected charging data to the CHF.

For a method for collecting charging data and reporting the collected charging data to the CHF by the NSMF, the NSSMF, the NFMF, and the NF, refer to the related descriptions in the embodiment of FIG. 2. Details are not described herein again.

Figure 4:
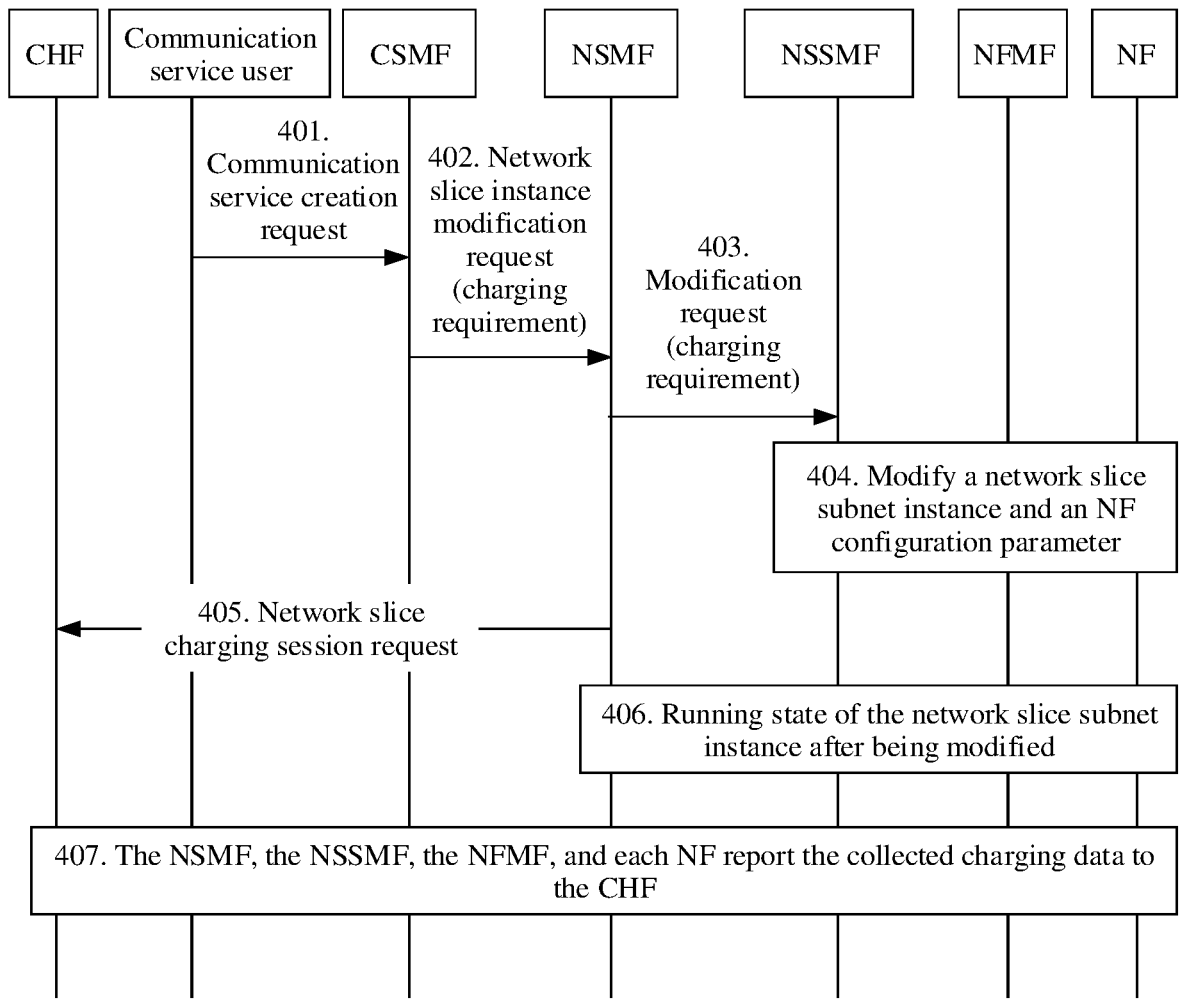
FIG. 4 is a schematic diagram of another network slice charging method according to an embodiment of this application.

FIG. 4 is a schematic flowchart of another network slice charging method according to this application. In this method, a network slice is charged in a network slice instance adding process in a network slice instance running phase.

The method includes the following steps:

Step 401: A communication service user sends a communication service creation request to a CSMF. Correspondingly, the CSMF may receive the communication service creation request.

Step 402: The CSMF sends a network slice instance modification request to an NSMF. Correspondingly, the NSMF may receive the network slice instance modification request.

The network slice instance modification request carries a charging requirement required by a network slice instance. For content included in the charging requirement, refer to the descriptions in the embodiment of FIG. 2. Details are not described herein again.

Step 403: The NSMF sends a modification request to an NSSMF. Correspondingly, the NSSMF may receive the modification request.

The modification request may carry the charging requirement. The modification request is used to request to modify a network slice subnet instance and an NF configuration parameter.

Step 404: The NSSMF modifies the network slice subnet instance and the NF configuration parameter.

It should be noted that the network slice instance is in a running state, and the modification of the network slice subnet instance may be completed by modifying a network configuration, or may be completed by scaling out the network slice subnet instance.

The modifying an NF configuration parameter herein includes but is not limited to increasing a capacity and adding a newly configured S-NSSAI parameter.

In this process, the NSSMF divides the charging requirement into a plurality of charging sub-requirements, and sends the plurality of charging sub-requirements to NFs.

Step 405: The NSMF sends a network slice charging session request to a CHF. Correspondingly, the CHF may receive the network slice charging session request.

If the network slice instance is an exclusive service or starts a service, the NSMF may send the network slice charging session request (the request is an initial request) to the CHF. After the CHF receives the network slice charging session request, the CHF enables network slice instance charging CHF CDR.

In an alternative implementation solution of step 405, if the network slice charging that the NSMF requests the CHF to create is event-based charging, the NSMF may alternatively send an event charging request (the request is an initial request) to the CHF. After the CHF receives the event charging request, the CHF enables network slice instance charging CHF CDR.

In an implementation method, in this step, the NSMF may obtain an address of the CHF based on a rule of selecting a charging function in the charging requirement.

Step 406: A running state of the network slice subnet instance after being modified.

Step 407: The NSMF, the NSSMF, the NFMF, and each NF report the collected charging data to the CHF.

For a method for collecting charging data and reporting the collected charging data to the CHF by the NSMF, the NSSMF, the NFMF, and the NF, refer to the related descriptions in the embodiment of FIG. 2. Details are not described herein again.

The foregoing mainly describes, from a perspective of interaction between network elements, solutions provided in this application. It may be understood that, to implement the foregoing functions, each network element includes a corresponding hardware structure and/or software module for implementing each function. A person skilled in the art should be easily aware that units, algorithms, and steps in the examples described with reference to the embodiments disclosed in this specification can be implemented by hardware or a combination of hardware and computer software in the present invention. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of the present invention.

An embodiment of this application further provides an apparatus configured to implement any one of the foregoing methods, for example, provides an apparatus including units (or means) configured to implement steps performed by the network slice management network element in any one of the foregoing methods. For another example, another apparatus is further provided, and includes units (or means) configured to implement steps performed by the network slice subnet management network element in any one of the foregoing methods. For another example, another apparatus is further provided, and includes units (or means) configured to implement steps performed by the network function network element in any one of the foregoing methods.

Figure 5:
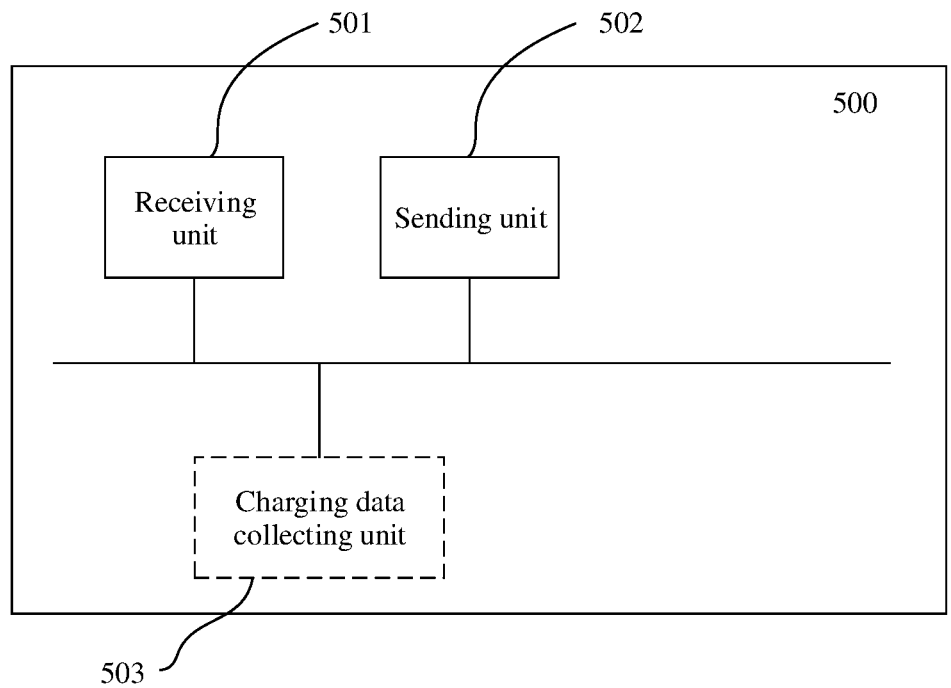
FIG. 5 is a schematic diagram of a communication apparatus according to an embodiment of this application.

For example, FIG. 5 is a schematic diagram of a communication apparatus according to an embodiment of this application. The apparatus is used in a network slice management network element. As shown in FIG. 5, the apparatus 500 includes a receiving unit 501 and a sending unit 502. Optionally, the apparatus 500 further includes a charging data collecting unit 503.

The receiving unit 501 is configured to receive a first request, where the first request includes a charging requirement of a network slice. The sending unit 502 is configured to send a second request to a network slice subnet management network element, where the second request includes the charging requirement. The receiving unit 501 is further configured to receive first charging data of the network slice, where the first charging data is collected based on the charging requirement. The sending unit 502 is further configured to send the first charging data to a charging network element, where the first charging data is used by the charging network element to charge the network slice.

In a possible implementation method, the first charging data is from one or more of the following network elements: the network slice subnet management network element, a network function network element, and a network function management network element.

In a possible implementation method, the charging data collecting unit 503 is configured to collect second charging data based on the charging requirement; and the sending unit 502 is further configured to send the second charging data to the charging network element, where the second charging data is used by the charging network element to charge the network slice.

In a possible implementation method, the sending unit 502 is further configured to send a third request to the charging network element, where the third request is used to request to enable a network slice instance charging function.

In a possible implementation method, the third request is a network slice charging session request or an event charging request.

In a possible implementation method, the charging requirement includes at least one of the following: a charged object, a charging mode, and a rule for selecting a charging function.

In a possible implementation method, the first request is a network slice instance creation request, and the second request is a network slice subnet instance creation request. Alternatively, the first request is a network slice instance modification request, and the second request is a network slice subnet instance modification request.

Figure 6:
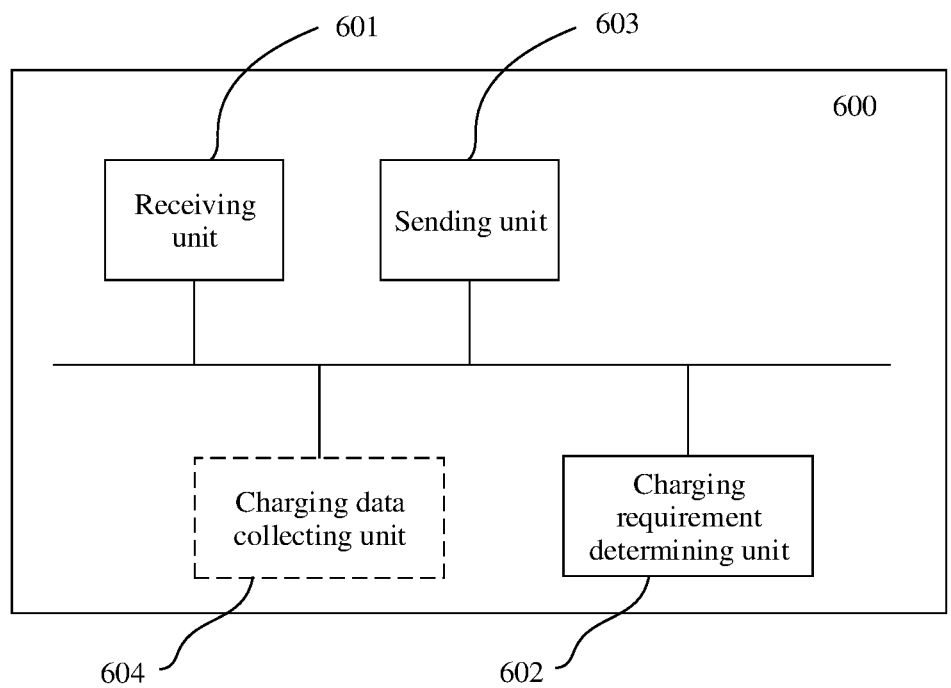
FIG. 6 is schematic diagram of another communication apparatus according to an embodiment of this application.

For example, FIG. 6 is a schematic diagram of another communication apparatus according to an embodiment of this application. The apparatus is used in a network slice subnet management network element. As shown in FIG. 6, the apparatus 600 includes a receiving unit 601, a charging requirement determining unit 602 and a sending unit 603. Optionally, the apparatus 600 further includes a charging data collecting unit 604.

The receiving unit 601 is configured to receive a second request from a network slice management network element, where the second request includes a charging requirement. The charging requirement determining unit 602 is configured to determine, based on the charging requirement, a first charging sub-requirement corresponding to a network function network element. The sending unit 603 is configured to send the first charging sub-requirement to the network function network element, where the first charging sub-requirement is used by the network function network element to collect first charging data of a network slice, and the first charging data is used by a charging network element to charge the network slice.

In a possible implementation method, the receiving unit 601 is further configured to receive the first charging data from the network function network element; and the sending unit 603 is further configured to: send the first charging data to the network slice management network element, where the first charging data is sent by the network slice management network element to the charging network element, or send the first charging data to the charging network element.

In a possible implementation method, the charging requirement determining unit 602 is further configured to determine, based on the charging requirement, a second charging sub-requirement corresponding to the network slice subnet management network element; and the charging data collecting unit 604 is configured to collect second charging data of the network slice based on the second charging sub-requirement, where the second charging data is used by the charging network element to charge the network slice.

In a possible implementation method, the sending unit 603 is further configured to: send the second charging data to the network slice management network element, where the second charging data is sent by the network slice management network element to the charging network element; or send the second charging data to the charging network element.

In a possible implementation method, the second request is a network slice subnet instance creation request or a network slice subnet instance modification request.

Figure 7:
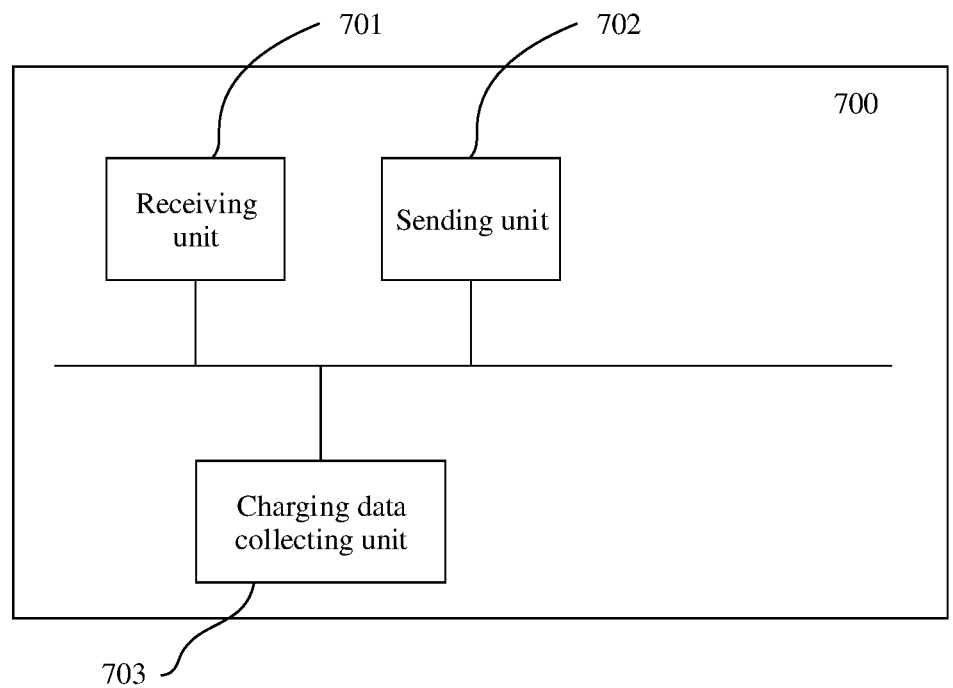
FIG. 7 is schematic diagram of another communication apparatus according to an embodiment of this application.

For example, FIG. 7 is a schematic diagram of another communication apparatus according to an embodiment of this application. The apparatus is used in a network function network element. As shown in FIG. 7, the apparatus 700 includes a receiving unit 701, a sending unit 702 and a charging data collecting unit 703.

The receiving unit 701 is configured to receive a charging requirement of a network slice. The charging data collecting unit 703 is configured to collect charging data of the network slice based on the charging requirement. The sending unit 702 is configured to send the charging data, where the charging data is used by a charging network element to charge the network slice.

In a possible implementation method, the sending unit 702 is specifically configured to: send the charging data to a network slice subnet management network element, where the charging data is sent by the network slice subnet management network element to the charging network element; send the charging data to a network slice management network element, where the charging data is sent by the network slice management network element to the charging network element; or send the charging data to the charging network element.

It should be understood that division into the units in the foregoing apparatuses is merely logical function division. In an actual implementation, all or some of the units may be integrated into a physical entity, or may be physically separate. In addition, all the units in the apparatuses may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of an apparatus for implementation. Alternatively, each unit may be stored in a memory in a form of a program to be invoked by a processing element of an apparatus to perform a function of the unit. In addition, all or some of the units may be integrated together, or may be implemented independently. The processing element herein may also be referred to as a processor, and may be an integrated circuit having a signal processing capability. In an implementation process, the steps in the foregoing methods or the foregoing units may be implemented by using a hardware integrated logic circuit of the processing element, or may be implemented in a form of software invoked by the processing element.

For example, a unit in any one of the foregoing apparatuses may be one or more integrated circuits configured to implement the foregoing methods, for example, one or more application-specific integrated circuits (ASIC), one or more microprocessors (digital signal processor, DSP), one or more field programmable gate arrays (FPGAs), or a combination of at least two of the integrated circuits. For another example, when a unit in the apparatus is implemented in a form of a program invoked by the processing element, the processing element may be a general-purpose processor, for example, a central processing unit (CPU), or another processor that can invoke the program. For still another example, the units may be integrated and implemented in a form of a system-on-a-chip (SOC).

The foregoing unit for receiving (for example, the receiving unit) is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing unit for sending (for example, the sending unit) is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

Figure 8:
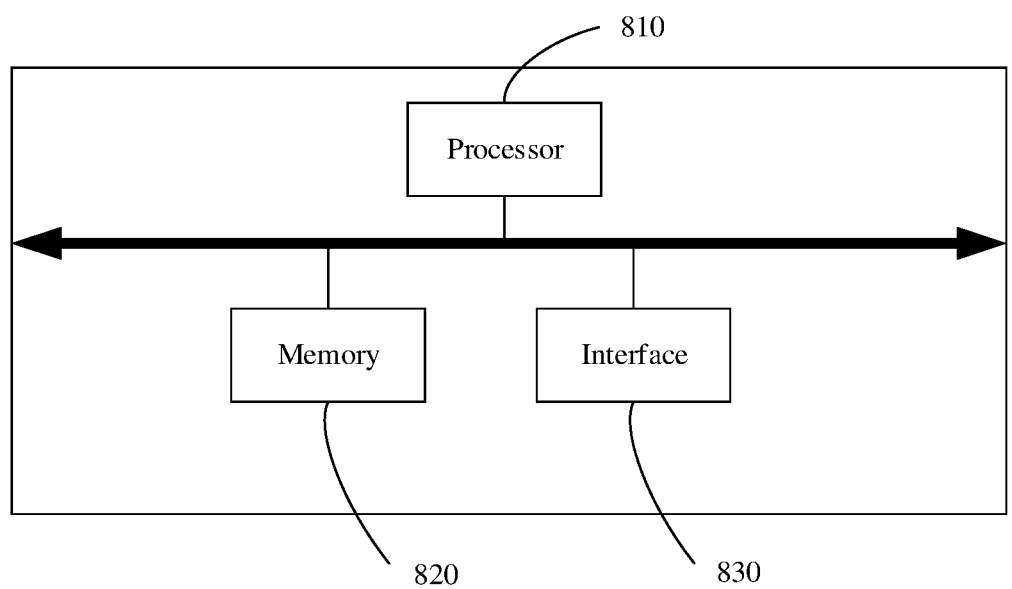
FIG. 8 is a schematic diagram of a communication apparatus according to an embodiment of this application.

FIG. 8 is a schematic diagram of a structure of a communication apparatus according to an embodiment of this application. The communication apparatus may be a network slice management network element, a network slice subnet management network element, or a network function network element, configured to implement operations of the network slice management network element, the network slice subnet management network element, or the network function network element in the foregoing embodiments. As shown in FIG. 8, the communication apparatus includes a processor 810, a memory 820, and an interface 830. The processor 81o, the memory 820, and the interface 830 are signal-connected.

The method performed by the communication apparatus in the foregoing embodiments may be implemented by the processor 81o invoking a program stored in the memory 820. That is, the communication apparatus includes a memory and a processor. The memory is configured to store a program, and the program is invoked by the processor to perform the methods performed by the communication apparatus in the foregoing method embodiments. The processor herein may be an integrated circuit having a signal processing capability, for example, a CPU. The apparatus for the session management network element may be implemented by one or more integrated circuits configured to implement the foregoing methods, for example, one or more ASICs, one or more microprocessors DSPs, one or more FPGAs, or a combination of at least two of the integrated circuits. Alternatively, the foregoing implementations may be combined.

A person of ordinary skill in the art may understand that various numerals such as first and second in this application are merely distinguished for convenient description, but are not used to limit a scope of the embodiments of this application, and also are not used to indicate a sequence.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

In one or more exemplary designs, the functions described in this application may be implemented by using hardware, software, firmware, or any combination thereof. If the functions are implemented by using software, these functions may be stored in a computer-readable medium or transmitted on a computer-readable medium in a form of one or more instructions or code. The computer-readable medium includes a computer storage medium or a communication medium that enables a computer program to move from one place to another place. The storage medium may be any available medium accessible by a general-purpose computer or a special computer. For example, such a computer-readable medium may include but is not limited to a RAM, a ROM, an EEPROM, a CD-ROM, or another optical disc storage, a disk storage or another magnetic storage apparatus, or any other medium that may be used to carry or store program code in a form of an instruction or a data structure and another form readable by a general-purpose computer or a special computer or a general-purpose processor or a special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in the defined computer-readable medium. The disk and the disc include a compact disc, a laser disc, an optical disc, a digital versatile disc (DVD), a floppy disk, and a Blu-ray disc. The disc usually copies data by a magnetic means, and the disk optically copies data by a laser means. The foregoing combination may alternatively be included in the computer-readable medium.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communication medium, where the communications medium includes any medium that enables a computer program to be transmitted from one place to another. The storage medium may be any available medium accessible to a general-purpose or special-purpose computer.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and is considered as any of or all modifications, variations, combinations or equivalents that cover the scope of this application. Obviously, a person skilled in the art can make various modifications and variations to this application without departing from the scope of this application. This application is intended to cover these modifications and variations of this application provided that they fall within the scope of the claims of this application and their equivalent technologies.

What is claimed is:

1. A communication apparatus, comprising:
   at least one processor; and
   a memory coupled to the at least one processor and having program instructions stored thereon which, when executed by the at least one processor, cause the apparatus to:
   obtain a charging requirement of a network slice, wherein the charging requirement includes at least one of a charged object or a charging mode;
   collect charging data of the network slice based on the charging requirement, wherein the charging data comprises a quantity of users and a quantity of protocol data unit (PDU) sessions in a network slice instance of the network slice;
   determine that a trigger for sending the charging data is met; and
   a transmitter, configured to send the charging data to a charging network element when the trigger for sending the charging data is met, wherein the charging data is used to charge the network slice.

2. The apparatus according to claim 1, wherein the program instructions further cause the apparatus to:
   send the charging data to the charging network element through a network slice management network element.

3. The communication apparatus according to claim 1, wherein the instructions to cause the apparatus to obtain the charging requirement of the network slice comprises instructions that cause the apparatus to:

receive the charging requirement of the network slice from a network slice subnet management network element.

4. The communication apparatus according to claim 3, wherein the instructions that cause the apparatus to receive the charging requirement of the network slice from the network slice subnet management network element comprises instructions that cause the apparatus to:
receive the charging requirement of the network slice from the network slice subnet management network element in a network slice instantiation process for the network slice.

5. The communication apparatus according to claim 1, wherein the charging data comprises at least one of the following:
a quantity of user connections, a throughput, or performance statistics data in the network slice instance.

6. The communication apparatus according to claim 1, wherein the transmitter being configured to send the charging data to the charging network element comprises the transmitter being configured to:
send, through a network slice subnet management network element, the charging data to the charging network element.

7. The communication apparatus according to claim 1, wherein the instructions that cause the apparatus to obtain the charging requirement of the network slice from a network slice management network element comprises instructions that cause the apparatus to:
obtain the charging requirement of the network slice from the network slice management network element in a network slice instantiation process for the network slice.

8. A method, comprising:
obtaining, by a network function network element, a charging requirement of a network slice, wherein the charging requirement includes at least one of a charged object or a charging mode;
collecting, by the network function network element, charging data of the network slice based on the charging requirement, wherein the charging data comprises a quantity of users and a quantity of protocol data unit (PDU) sessions in a network slice instance of the network slice;
determining a trigger for sending the charging data is met; and
sending, by the network function network element, the charging data to a charging network element when the trigger for sending the charging data is met, wherein the charging data is used to charge the network slice.

9. The method according to claim 8, wherein obtaining, by the network function network element, the charging requirement of the network slice, comprises:
receiving, by the network function network element, the charging requirement of the network slice from a network slice subnet management network element.

10. The method according to claim 9, wherein receiving, by the network function network element, the charging requirement of the network slice from the network slice subnet management network element, comprises:
receiving, by the network function network element, the charging requirement of the network slice from the network slice subnet management network element in a network slice instantiation process for the network slice.

11. The method according to claim 8, wherein the charging data comprises at least one of the following:
a quantity of user connections, a throughput and performance statistics data in the network slice instance.

12. The method according to claim 8, wherein sending, by the network function network element, the charging data to the charging network element, comprises:
sending, through a network slice management network element by the network function network element, the charging data to the charging network element.

13. The method according to claim 8, wherein sending, by the network function network element, the charging data to the charging network element, comprises:
sending, through a network slice subnet management network element by the network function network element, the charging data to the charging network element.

14. The method of claim 8, wherein obtaining, by the network function network element, the charging requirement of the network slice from a network slice management network element, comprises:
obtaining, by the network function network element, the charging requirement of the network slice from a network slice subnet management network element in a network slice instantiation process for the network slice.

15. A method comprising:
receiving, by a network slice management network element, a first request, wherein the first request comprises a charging requirement of a network slice;
sending, by the network slice management network element, a second request to a network slice subnet management network element, wherein the second request comprises the charging requirement;
receiving, by the network slice subnet management network element, the second request from the network slice management network element;
determining, by the network slice subnet management network element based on the charging requirement, a first charging sub-requirement corresponding to a network function network element; and
sending, by the network slice subnet management network element, the first charging sub-requirement to the network function network element, wherein the first charging sub-requirement comprises information used to collect first charging data of the network slice by the network function network element, and the first charging data comprises data used by a charging network element to charge the network slice;
receiving, by the network slice management network element, the first charging data of the network slice, wherein the first charging data is based on the charging requirement; and
sending, by the network slice management network element, the first charging data to the charging network element to charge the network slice.

16. The method according to claim 15, wherein the first charging data comprises data of one or more of following network elements:
the network slice subnet management network element, the network function network element, and a network function management network element.

17. The method according to claim 15, further comprising:
receiving, by the network slice subnet management network element, the first charging data from the network function network element; and
sending, by the network slice subnet management network element, the first charging data to the charging network element through the network slice management network element, or directly sending, by the network slice subnet management network element, the first charging data to the charging network element.

18. The method according to claim 15, further comprising:
   receiving, by the network function network element, the first charging sub-requirement;
   collecting, by the network function network element, charging data of the network slice based on the first charging sub-requirement; and
   sending, by the network function network element, the charging data, wherein the charging data comprises data used by the charging network element to charge the network slice.

19. The method according to claim 18, wherein the sending, by the network function network element, the charging data comprises:
   sending, by the network function network element, the charging data to the charging network element through the network slice subnet management network element;
   sending, by the network function network element, the charging data to the charging network element through the network slice management network element; or
   directly sending, by the network function network element, the charging data to the charging network element.

20. The method according to claim 15, further comprising:
   determining, by the network slice subnet management network element based on the charging requirement, a second charging sub-requirement corresponding to the network slice subnet management network element; and
   collecting, by the network slice subnet management network element, second charging data of the network slice based on the second charging sub-requirement, wherein the second charging data comprises data used by the charging network element to charge the network slice.

* * * * *